(No Model.)
W. E. KEESE.
PLOW.
No. 460,292.  Patented Sept. 29, 1891.
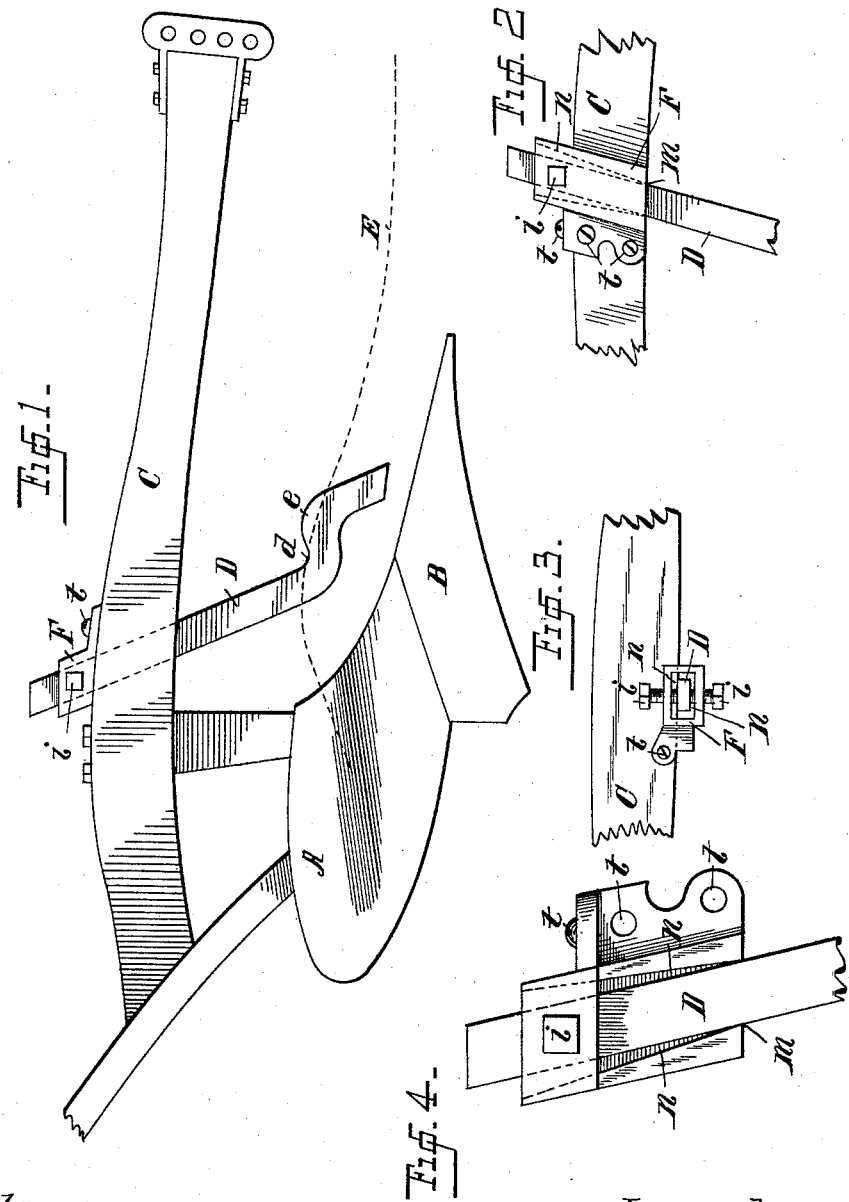
Witnesses:-
W. H. Courtland
E. C. Grigg
Inventor:-
W. E. Keese
by Rost H Head
Atty

UNITED STATES PATENT OFFICE.

WILL E. KEESE, OF WINNEBAGO, WISCONSIN.

PLOW.

SPECIFICATION forming part of Letters Patent No. 460,292, dated September 29, 1891.

Application filed December 29, 1890. Serial No. 376,011. (No model.)

*To all whom it may concern:*

Be it known that I, WILL E. KEESE, a citizen of the United States, residing at Winnebago, in the county of Winnebago and State of Wisconsin, have invented certain new and useful Improvements in Plows; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in colters and their attachment to plows; and the objects of my invention are, first, to prevent grass, stubble, and the like from clogging in front of the plow below the beam, and, second, to provide a ready means of attaching the colter to the beam and adjusting it as desired.

In the accompanying drawings, Figure 1 is a side view of the plow. Fig. 2 is a side view, and Fig. 3 a top view, of the colter attachment; Fig. 4, a view of the opposite side when removed from the beam.

Similar letters refer to similar parts throughout the several views.

A is the mold-board, B the point, and C the beam, of the plow. The colter D is of the peculiar shape and construction shown in Fig. 1, having a double bend at $e$ and at $d$.

The line E represents the surface of the land. I locate the colter so that the projection $e$ rises just above the land and the depression $d$ remains just below the land at the point where the furrow commences to turn over. The grass, stubble, &c., are thereby first caught and raised by the projection $e$, and then suddenly dropped and carried to one side by the furrow as it is rolled over by the mold-board. The location and adjustment of the colter are important. Figs. 2, 3, and 4 show the manner of attachment, so as to be adjustable forward or backward or sidewise.

I provide the plate or socket F, inclosing the colter and attached to the beam C by means of the bolts or screws $t\,t\,t$. This plate fits closely around the colter at the bottom $m$, and the rectangular opening therein diverges toward the top, the sides $n\,n\,n\,n$ inclining outwardly. By means of the set-screws $i\,i$, passing through opposite sides of the plate, I retain the colter in any desired position. Being pivoted at $m$, the top can be moved forward or backward or sidewise and retained at any position by the set-screws $i\,i$ from each side, so as to bring the lower portion of the colter to any desired position relative to the plow.

What I claim as my invention, and desire to secure by Letters Patent, is—

1. A colter adjustably secured to the beam of a plow, so as to be raised or lowered, and formed of a piece of metal bent near its lower end into two bends $e$ and $d$, the bend or projection $e$ curved upwardly and outwardly and the bend or depression $d$ curved downwardly and backwardly, the two bends united approximately forming a cyma reversa, whereby when the plow is operated the bend or projection $e$ rises just above the surface of the land and the bend or depression $d$ remains just below the surface of the land, substantially as and for the purpose described.

2. A plow-colter fastener formed with an upwardly-flared passage inclosed by four approximately vertical walls and having horizontal and approximately vertical bolting-brackets and provided with two clamping-screws passing through the side walls and binding on the sides of the colter, whereby the colter can be applied to the side of the beam and out of contact with the same and can be set and held at different altitudes and different angles, substantially as and for the purpose described.

In testimony whereof I affix my signature in presence of two witnesses.

WILL E. KEESE.

Witnesses:
 E. C. GRIGG,
 S. E. FIELD.